United States Patent
Yamane

(10) Patent No.: US 12,286,072 B2
(45) Date of Patent: Apr. 29, 2025

(54) VEHICLE WITH PET PROTECTION FUNCTION

(71) Applicant: SUBARU CORPORATION, Tokyo (JP)

(72) Inventor: Kazuya Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/980,753

(22) Filed: Nov. 4, 2022

(65) Prior Publication Data

US 2023/0158988 A1    May 25, 2023

(30) Foreign Application Priority Data

Nov. 21, 2021    (JP) .................. 2021-189066

(51) Int. Cl.
  *B60R 21/16*    (2006.01)
  *A01K 1/02*    (2006.01)
(52) U.S. Cl.
  CPC ............ *B60R 21/16* (2013.01); *A01K 1/0272* (2013.01)
(58) Field of Classification Search
  CPC .......... B60R 21/16; B60R 22/10; B60R 2021/23107; B60R 21/213; B60R 21/214; B60R 21/232; A01K 1/0272
  See application file for complete search history.

(56) References Cited

U.S. PATENT DOCUMENTS

| | | | | |
|---|---|---|---|---|
| 4,834,420 A | * | 5/1989 | Sankrithi | B60R 22/10 297/250.1 |
| 2008/0147280 A1 | * | 6/2008 | Breed | G01C 19/00 702/173 |
| 2008/0157510 A1 | * | 7/2008 | Breed | E05F 15/43 701/45 |
| 2009/0126638 A1 | * | 5/2009 | Bennett | A01K 1/0272 119/28.5 |
| 2011/0132277 A1 | * | 6/2011 | McAtamney | A01K 1/0272 119/752 |
| 2023/0202375 A1 | * | 6/2023 | Chmielewski | B60P 7/135 119/403 |
| 2023/0320316 A1 | * | 10/2023 | Cohn | G08B 25/00 119/850 |

FOREIGN PATENT DOCUMENTS

| | | | |
|---|---|---|---|
| CN | 217487230 U | * | 9/2022 |
| JP | 2019-146518 A | | 9/2019 |
| KR | 20200107301 A | * | 9/2020 |
| KR | 20200119578 A | * | 10/2020 |
| KR | 20200131490 A | * | 11/2020 |

\* cited by examiner

*Primary Examiner* — Drew J Brown
(74) *Attorney, Agent, or Firm* — MCGINN I.P. LAW GROUP, PLLC

(57) ABSTRACT

A vehicle with a pet protection function includes a pet guard body, a first air-bag device, and a controller. The pet guard body is disposed in a vehicle compartment of the vehicle on which a pet is to be loaded in such a manner that the pet guard body partitions a vehicle compartment into a front portion and a rear portion. The first air-bag device is configured to be deployed behind the pet guard body. The controller is configured to deploy the first air-bag device upon contact of the vehicle.

16 Claims, 9 Drawing Sheets

| SIZE | WEIGHT | TYPE | DEPLOYMENT SETTING |
|---|---|---|---|
| LARGE | --- | --- | HIGH OUTPUT |
| SMALL | HEAVY | --- | HIGH OUTPUT |
| SMALL | LIGHT | LARGE-SIZED DOG | HIGH OUTPUT |
| SMALL | LIGHT | SMALL-SIZED DOG | LOW OUTPUT |

VEHICLE WITH PET PROTECTION FUNCTION

CROSS-REFERENCE TO RELATED APPLICATIONS

The present application claims priority from Japanese Patent Application No. 2021489066 filed on Nov. 21, 2021, the entire contents of which are hereby incorporated by reference.

BACKGROUND

The disclosure relates to a vehicle with a pet protection function.

Some vehicles are provided with equipment such harnesses or cages to enhance safety of pets loaded on the vehicles.

The harness is worn by the pet and attached to, for example, a seatbelt of a vehicle body.

The cage is a box case to accommodate a pet. The cage is disposed on the floor of an occupant compartment or on a surface of a rear-row seat. Japanese Unexamined Patent Application Publication No. 2019-146518 discloses a cage attachable to, for example, a seatbelt of a vehicle body.

Using such a harness or a cage makes it possible to enhance safety of a pet loaded on a vehicle.

SUMMARY

An aspect of the disclosure provides a vehicle with a pet protection function. The vehicle includes a pet guard body, a first air-bag device, and a controller. The pet guard body is disposed in a vehicle compartment of the vehicle on which a pet is to be loaded in such a manner that the pet guard body partitions a vehicle compartment into a front portion and a rear portion. The first air-bag device is configured to be deployed behind the pet guard body. The controller is configured to deploy the first air-bag device upon contact of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
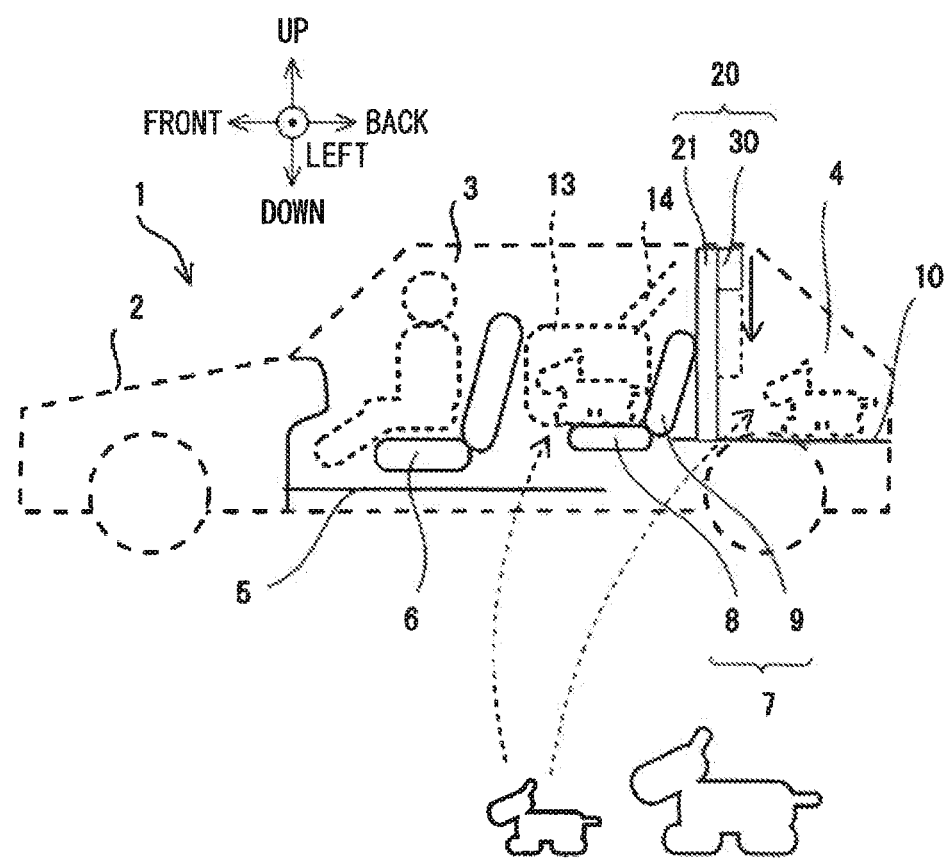
FIG. 1 is an explanatory diagram of an automobile with a pet protection function according to one example embodiment of the disclosure.

A recent study has reported that safety of a pet in a vehicle is not necessarily enhanced by the use of a harnesses or a cage. The study has also reported that safety of a pet in a vehicle is not significantly enhanced even if the harness or cage is attached to a seatbelt.

According to the report, it is preferable to put a pet into a cage and place the cage in a cargo room of a vehicle in order to enhance the safety of the pet.

However, if a pet is put into a cage and the case is placed in the cargo room, the field of view of an occupant toward the cage is blocked by, for example, a seat back of a rear-row seat in an occupant compartment.

This prevents the occupant in the occupant compartment, in particular, an occupant seated in a front-row seat, from checking the state of the pet even when the occupant looks back. The occupant has to stop the vehicle, get out of the vehicle, and go to the cargo room to check the state of the pet.

Further, the pet loaded on the vehicle and prevented from seeing its owner for a long time may feel anxious.

It is desirable to provide a vehicle that makes it possible to enhance safety of a pet in a vehicle while securing convenience of an occupant.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 illustrates an automobile 1 with a pet protection function according to a first example embodiment of the disclosure.

The automobile 1 illustrated in FIG. 1 may have a vehicle body 2. The vehicle body 2 may include a vehicle compartment which is a combination of an occupant compartment 3 for a driver and occupants, and a cargo room 4. In one embodiment, the automobile 1 may serve as a "vehicle".

In the occupant compartment 3, a front-row seat 6 and a rear-row seat 7 in which occupants of the automobile 1 are to be seated may be arranged on a floor 5 of the occupant compartment 3 in a front-back direction.

The cargo room 4 may be provided behind the occupant compartment 3. In this example, the rear-row seat 7 may be located immediately in front of the cargo room 4. The rear-row seat 7 located in front of the cargo room 4 may have a seat back 9. The seat back 9 may extend upward from a seat surface 8 of the rear-row seat 7 to serve as a partition board dividing the vehicle compartment into the occupant compartment 3 and the cargo room 4. The cargo room 4 and the occupant compartment 3 may be communicated with each other via an opening provided between the seat back 9 of the rear-row seat 7 and the ceiling of the vehicle compartment.

Such an automobile 1 may accommodate pets, such as large-sized dogs and small-sized dogs, as well as occupants.

When being loaded on the automobile 1, a pet with a harness may be placed on the seat surface 8 of the rear-row seat 7 or on the floor 5 of the occupant compartment 3 below the rear-row seat 7. The harness worn by the pet may be coupled to a seatbelt device 57 of an occupant protection control apparatus 47 disposed in the automobile 1.

Alternatively, the pet may be placed inside a cage that is a box case to accommodate pets, and the cage may be placed on the seat surface 8 of the rear-row seat 7 or on the floor 5 of the occupant compartment 3 below the rear-row seat. The cage may be coupled to the seatbelt device 57 of the occupant protection control apparatus 47 disposed in the automobile 1.

Such a use of a harness or a cage has been considered as a safety measure to protect a pet in the automobile 1.

However, a recent study has reported that the safety of a pet is not necessarily enhanced by the use of a harness or a cage. It is difficult to effectively prevent a pet wearing a harness or accommodated in a cage from being thrown toward a front portion of the vehicle compartment upon frontal contact of the automobile 1.

The study has also reported that it is desirable to accommodate a pet in a cage and place the cage in the cargo room 4 to enhance the safety of the pet.

However, if a pet is accommodated in a cage and the cage is placed in the cargo room 4, the field of view of an occupant seated in the occupant compartment 3 toward the cage is blocked by, for example, the seat back 9 of the rear-row seat 7.

This prevents an occupant seated in the occupant compartment 3, in particular, an occupant seated in the front-row seat 6, from checking the state of the pet even when the occupant looks back. The occupant has to stop the automobile 1, get out of the automobile 1, and go to the cargo room 4 to check the state of the pet.

Further, the pet loaded on the automobile 1 and prevented from seeing its owner for a long time may feel anxious.

Thus, there is a demand for the automobile 1 that makes it possible to enhance the safety of a pet while securing convenience of an occupant.

To address such an issue, in this example embodiment of the disclosure, a pet guard apparatus 20 is used which serves as a see-through partition between the occupant compartment 3 and the cargo room 4.

The pet guard apparatus 20 includes a pet guard body 21 and a pet air-bag device 30. In one embodiment, the pet air-bag device 30 may serve as a "first air-bag device".

The pet guard apparatus 20 may be detachable from the vehicle body 2 of the automobile 1. The pet guard apparatus 20 may thus be retrofitted to the vehicle body 2 of the automobile 1 by, for example, a user.

A pet placed behind the pet guard apparatus 20 attached to the automobile 1 is blocked by the pet guard apparatus 20. This prevents the pet from being easily thrown forward over the pet guard apparatus 20.

Figure 2:
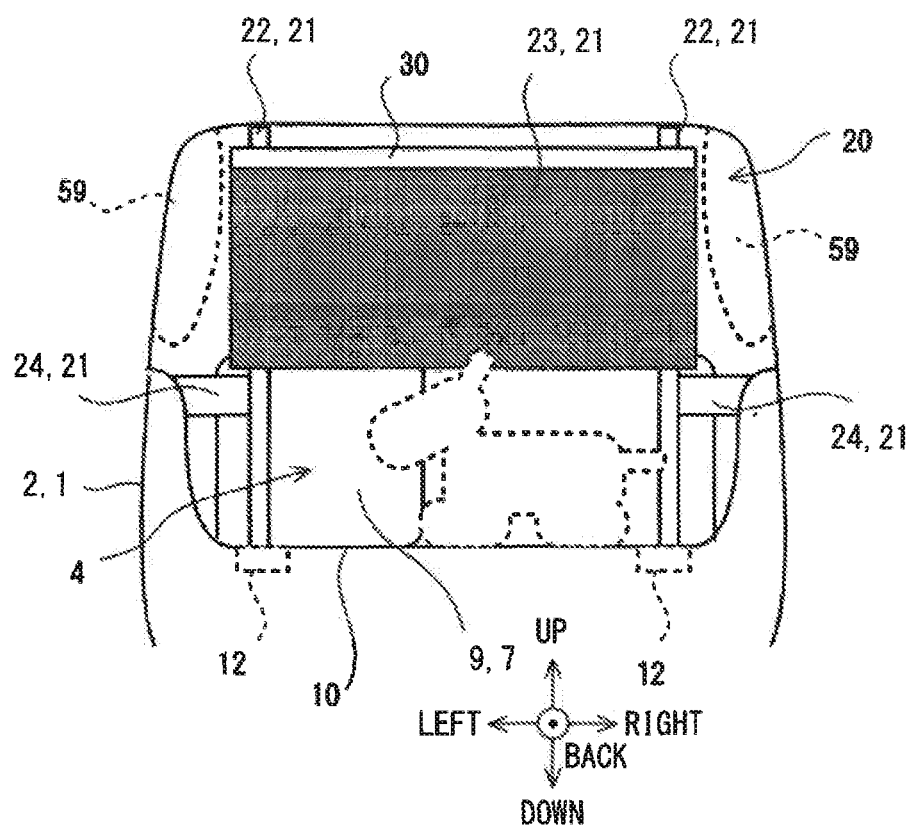
FIG. 2 is an explanatory diagram illustrating an exemplary state of a pet guard apparatus attached to the automobile illustrated in FIG. 1.

FIG. 2 illustrates an exemplary state of the pet guard apparatus 20 attached to the automobile 1 illustrated in FIG. 1.

FIG. 2 is a rear view of a part of the vehicle body 2 to which the pet guard apparatus 20 is attached.

The pet guard body 21 may include a pair of bars 22 and a mesh member 23. The pet guard body 21 may be attached to the vehicle body 2.

The bars 22 may be, for example, metal bars each having a columnar shape.

The bars 22 may each have a length enough to extend in a vertical direction from a floor 10 of the cargo room 4 to the ceiling of the cargo room 4 to which the pet guard body 21 is attached. The bars 22 may each have a fixed length determined on the basis of the size of the vehicle compartment or a length adjustable depending on the size of the cargo room 4.

Each of the bars 22 may be a hollow column. A wiring line coupling the pet air-bag device 30 to a control system 40 of the automobile 1 described below may extend through each of the bars 22.

The mesh member 23 may be, for example, a metal or resin mesh having a horizontally long, substantially rectangular shape. The pet in the cargo room 4 is thus visually recognizable from the front portion of the vehicle compartment through the mesh member 23. Alternatively, the pet guard body 21 may include a transparent or semi-transparent panel in place of or in combination with the mesh member 23.

The substantially rectangular mesh member 23 may have a width substantially equal to the width of the cargo room 4. Alternatively, the substantially rectangular mesh member 23 may have a width smaller than the width of the cargo room 4 so as not to cover deploying regions of side curtain air-bag devices 59 to be deployed at left and right sides of the cargo room 4.

The substantially rectangular mesh member 23 may have a height determined on the basis of the distance between an upper edge of the seat back 9 of the rear-row seat 7 to the ceiling of the vehicle body 2. Alternatively, the mesh member 23 may be adjustable in width and height when being attached to the vehicle body 2. In this case, the mesh member 23 may include a plurality of metal mesh sheets overlaid on each other and slidable over each other.

The horizontally long, substantially rectangular mesh member 23 may be provided with the paired bars 22 attached to respective ends of the mesh member 23 in the left-right direction. The paired bars 22 provided at the left and right ends of the horizontally long, substantially rectangular mesh member 23 may project in the up-down directions from an upper end and a lower end of the mesh member 23. The upper end and the lower end of each of the paired bars 22 may be fixed to respective receivers 12 provided at the vehicle body 2.

Paired auxiliary panels 24 may be attached to the respective bars 22. The auxiliary panels 24 may extend outwardly from the respective bars 22 in a vehicle width direction. The paired auxiliary panels 24 projecting outwardly from the respective bars 22 may be fixed to the vehicle body 2 with screws or other fixing means.

The pet guard body 21 described above may be attached to the cargo room 4 behind the rear-row seat 7 such that the horizontally long, substantially rectangular mesh member 23 overlaps with a space between the upper edge of the seat back 9 of the rear-row seat 7 and the ceiling of the vehicle body 2. The paired bars 22 may be fixed to the respective receivers 12 provided at the vehicle body 2.

This allows the pet guard body 21 to partition the vehicle compartment into a front portion and a rear portion, i.e., the occupant compartment 3 and the cargo room 4.

Accordingly, the pet placed in the cargo room 4 is prevented from moving forward from the cargo room 4 to the occupant compartment 3. Even if the automobile 1 makes frontal contact, the pet is prevented from being easily thrown forward over the seat back 9 of the rear-row seat 7 toward the occupant compartment 3.

The occupant seated in, for example, the front-row seat 6 is able to visually identify and check the pet placed in the cargo room 4 through the pet guard body 21 in a mesh form by looking back.

The pet placed in the cargo room 4 is able to visually identify the occupant in the occupant compartment 3 through the pet guard body 21 in a mesh form. Further, the pet is able to spend time feeling comfortable in the cargo room 4 without being trapped in a cage narrower than the cargo room 4.

Alternatively, the pet guard body 21 may have a transparent member in place of the mesh member 23. The transparent member may be a resin panel, for example. However, in a case where a resin panel is used as the transparent member, the resin panel may reflect light entering from another vehicle to the vehicle compartment of the automobile 1 while the automobile 1 is traveling. Thus, it is desirable to use the mesh member 23 rather than the transparent member such as the resin panel.

The pet air-bag device 30 may be attached to a rear side of the pet guard body 21 along an upper edge of the horizontally long, substantially rectangular mesh member 23. That is, the pet air-bag device 30 may be attached to the upper portion of the pet guard body 21 and extend in the left-right direction of the vehicle body 2, i.e., along the width of the vehicle body 2.

Upon contact such as frontal contact of the automobile 1, the pet air-bag device 30 of the pet guard apparatus 20 is deployed to prevent the pet in the cargo room 4 from easily and directly hitting against the pet guard body 21. This protects the safety of the pet.

Figure 3:
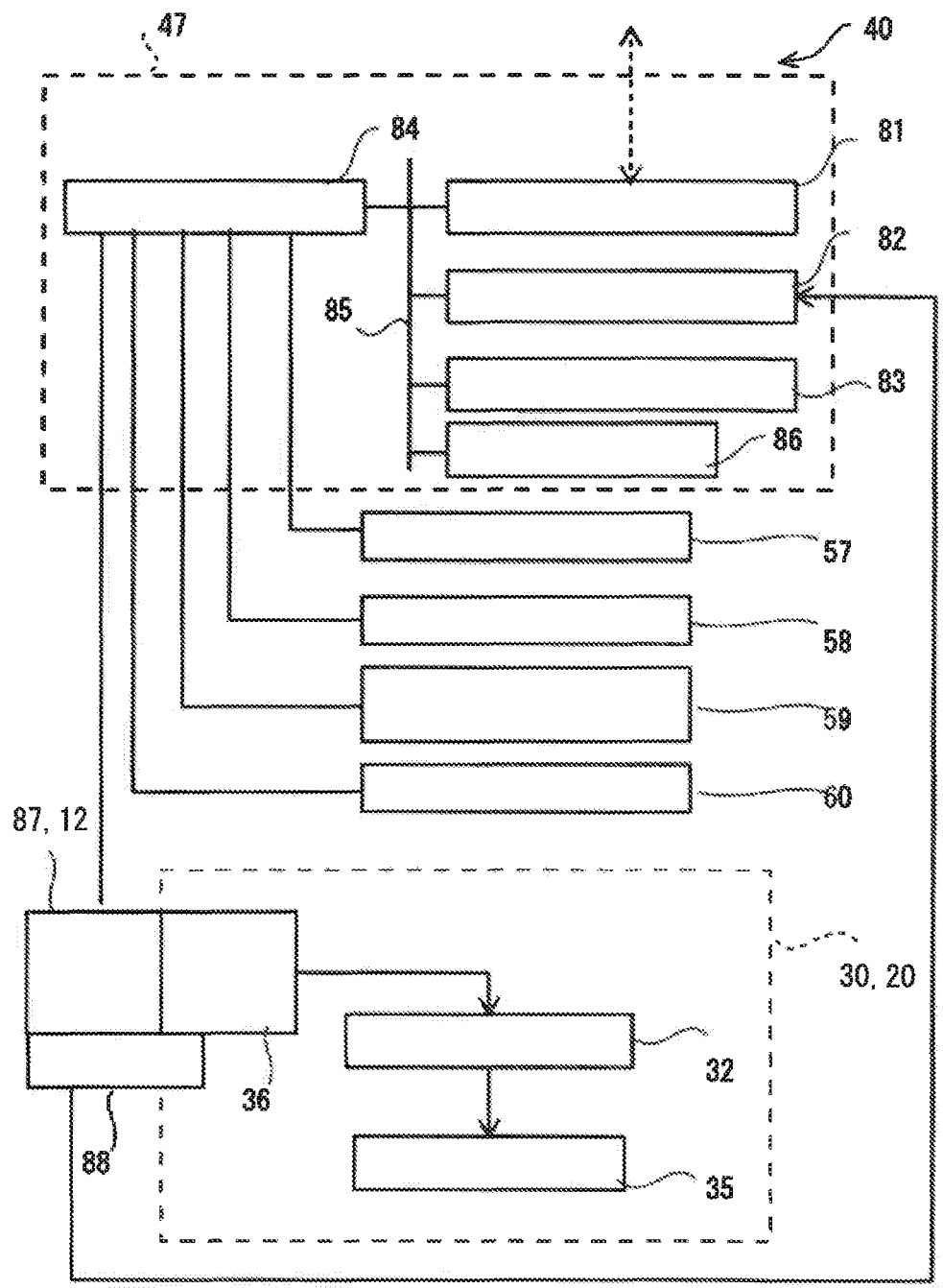
FIG. 3 is a block diagram illustrating a control system of the automobile including a pet air-bag device and having an occupant protection function.

FIG. 3 is a block diagram illustrating the control system 40 of the automobile 1 including the pet air-bag device 30 and having an occupant protection function.

In FIG. 3, the occupant protection control apparatus 47 and the pet air-bag device 30 in the control system 40 of the automobile 1 are illustrated.

The occupant protection control apparatus 47 may include an occupant protection communicator 81, an occupant protection ECU 82, an occupant protection memory 83, an occupant protection input/output port 84, an acceleration sensor 86, and an internal bus 85 that couples these devices to each other for data input and data output.

The acceleration sensor 86 may detect acceleration generated in automobile 1. The acceleration sensor 86 may detect acceleration rates in three axial directions of the automobile 1: the front-back direction, the left-right direction, and the up-down direction of the automobile 1.

A plurality of occupant protection devices provided in the automobile 1 to protect occupants or passengers may be coupled to the occupant protection input/output port 84. In this example embodiment, the seatbelt device 57, a front air-bag device 58, a side-curtain air-bag device 59, a seat air-bag device 60, and the pet air-bag device 30 may be separately coupled to the occupant protection input/output port 84. The occupant protection input/output port 84 may output an operation signal to each of the devices coupled to the occupant protection input/output port 84.

The seatbelt device 57 may hold an occupant seated in the front-row seat 6 or the rear-row seat 7 by a seatbelt.

The front air-bag device 58 may be an air-bag device to be deployed in front of the front-row seat 6.

The side-curtain air-bag device 59 may be an air-bag device to be deployed into an elongated form extending along a side face of the vehicle compartment in the front-back direction.

The seat air-bag device 60 may be an air-bag device to be deployed from a side face of the front-row seat 6.

The pet air-bag device 30 may include a device-side connector 36, a pet air-bag 35, and a pet air-bag inflator 32.

The device-side connector 36 may be coupled to the occupant protection input/output port 84 via a vehicle-side connector 87. In one embodiment, the device-side connector 36 may serve as a "connector" of the vehicle. The vehicle-side connector 87 may be provided at a receiver 12. In this case, the device-side connector 36 may be coupled to the vehicle-side connector 87 by attaching the pet guard apparatus 20 to the vehicle body 2.

The receiver 12 may be further provided with a coupling sensor 88. The coupling sensor 88 may detect coupling and decoupling between the device-side connector 36 and the vehicle-side connector 87. The coupling sensor 88 may be provided in the automobile 1 as a part of the occupant protection control apparatus 47.

As the device-side connector 36 of the pet air-bag device 30 is coupled to the vehicle-side connector 87 of the automobile 1 as described above, the pet air-bag device 30 may be detachable together with the pet guard body 21 to which the pet air-bag device 30 is attached from the vehicle body 2.

The pet air-bag inflator 32 may be coupled to the device-side connector 36. The pet air-bag inflator 32 may thus receive an operation signal outputted from the occupant protection input/output port 84. In response to the operation signal, the pet air-bag inflator 32 may be ignited to generate a high-pressure gas.

The pet air-bag 35 may be coupled to the pet air-bag inflator 32. The pet air-bag 35 may be a bag to be expanded and deployed by the high-pressure gas generated by the pet air-bag inflator 32. When being deployed, the pet air-bag 35 may have a horizontally long, substantially rectangular curtain-shape in a size substantially the same as or greater than the size of the horizontally long, substantially rectangular mesh member 23.

In an ordinary state, for example, the curtain-shaped pet air-bag 35 may be folded and stored in the pet guard apparatus 20 extending along the upper edge of the horizontally long, substantially rectangular mesh member 23.

Figure 8:
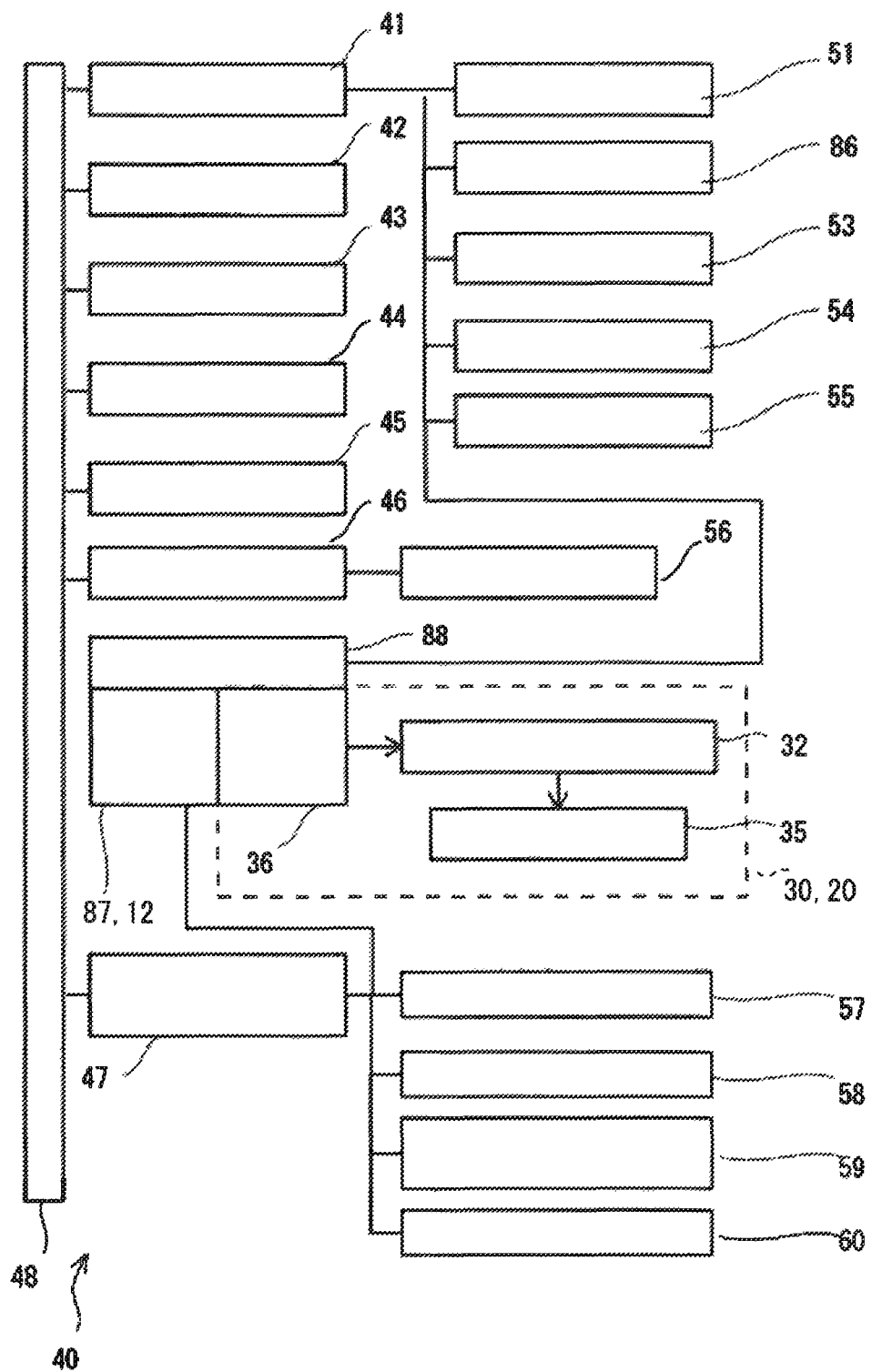
FIG. 8 is a block diagram of a control system of the automobile according to one example embodiment of the disclosure.

The occupant protection communicator 81 may be coupled to a central gateway (CGW) 48 by a bus cable as illustrated in FIG. 8 to be described later to communicate with the other devices in the control system 40 of the automobile 1.

The occupant protection memory 83 may store a program or data for occupant protection control. The occupant protection memory 83 may be a random access memory (RAM), a semiconductor memory, or a hard disk drive (HDD), for example.

The occupant protection ECU 82 may read the program from the occupant protection memory 83 and execute the program. The occupant protection ECU 82 may thereby serve as an occupant protection controller that controls an overall operation of the occupant protection control apparatus 47.

For example, the occupant protection ECU 82 may estimate and detect contact of the automobile 1 on the basis of various detection values and a captured image received from the vehicle detector 41.

The occupant protection ECU 82 may then select an output destination of an operation signal from the devices coupled to the occupant protection input/output port 84 on the basis of the form of the contact estimated or detected, and may output the operation signal to the device selected output destination.

For example, in a case where frontal contact of the automobile 1 is estimated or detected, the occupant protection ECU 82 may select the seatbelt device 57 and the front air-bag device 58 as the output destinations, and may output the operation signal to each of the selected output destinations.

In another case where side contact of the automobile 1 is estimated or detected, for example, the occupant protection ECU 82 may select the seatbelt device 57, the side-curtain air-bag device 59, and the seat air-bag device 60 as the output destinations, and may output the operation signal to each of the selected output destinations.

In this manner, the occupant protection ECU 82 may select any device as the output destination on the basis of the form of contact, and may cause the device to operate.

Figure 4:
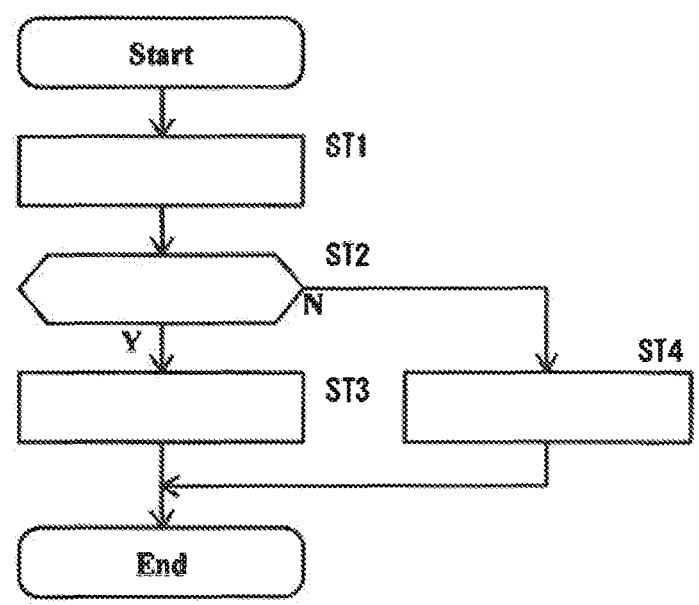
FIG. 4 is a flowchart of coupling detection control performed by the pet air-bag device.

FIG. 4 is a flowchart of coupling detection control in which coupling of the pet air-bag device 30 is detected.

The occupant protection ECU 82 may repeatedly execute the coupling detection control illustrated in FIG. 4 when the automobile 1 starts traveling, for example.

In Step ST1, coupling information regarding coupling of the pet air-bag device 30 may be acquired. The occupant protection ECU 82 may acquire the coupling information regarding coupling of the pet air-bag device 30 to the occupant protection input/output port 84 of the occupant protection control apparatus 47. The occupant protection ECU 82 may acquire detection information regarding coupling of the device-side connector 36 to the vehicle-side connector 87 from, for example, the coupling sensor 88.

In Step ST2, coupling or decoupling of the pet air-bag device 30 may be determined on the basis of the acquired coupling information. For example, the occupant protection ECU 82 may determine whether the pet air-bag device 30 is coupled to the occupant protection input/output port 84 of the occupant protection control apparatus 47 on the basis of the coupling information acquired in Step ST1.

If the device-side connector 36 is coupled to the vehicle-side connector 87, for example (Step ST2: Y), the occupant protection ECU 82 may determine that the pet air-bag device 30 is coupled to the occupant protection control apparatus 47 and cause the process to proceed to Step ST3.

In contrast, if the device-side connector 36 is not coupled to the vehicle-side connector 87 (Step ST2: N), the occupant protection ECU 82 may determine that the pet air-bag device 30 is not coupled to the occupant protection control apparatus 47 and cause the process to proceed to Step ST4.

In Step ST3, a setting for pet protection may be executed. For example, the occupant protection ECU 82 may execute a setting for the pet protection control in which the pet air-bag device 30 is deployed. The occupant protection ECU 82 may record a setting value indicating execution of a pet protection in the occupant protection memory 83. Thereafter, the occupant protection ECU 82 may end the control.

In Step ST4, the setting for the pet protection may be cancelled. The occupant protection ECU 82 may execute a setting for cancelling the pet protection control in which the pet air-bag device 30 is deployed. The occupant protection ECU 82 may record a setting value indicating cancellation of the pet protection in the occupant protection memory 83. Thereafter, the occupant protection ECU 82 may end the control.

As described above, the occupant protection ECU 82 may determine whether the pet air-bag device 30 is coupled to the vehicle-side connector 87. In one embodiment, the occupant protection ECU 82 may serve as a "controller". In a case where the pet air-bag device 30 is not coupled to the vehicle-side connector 87, the occupant protection ECU 82 may execute the setting control so that no operation signal that causes the pet air-bag device 30 to be deployed is outputted.

Figure 5:
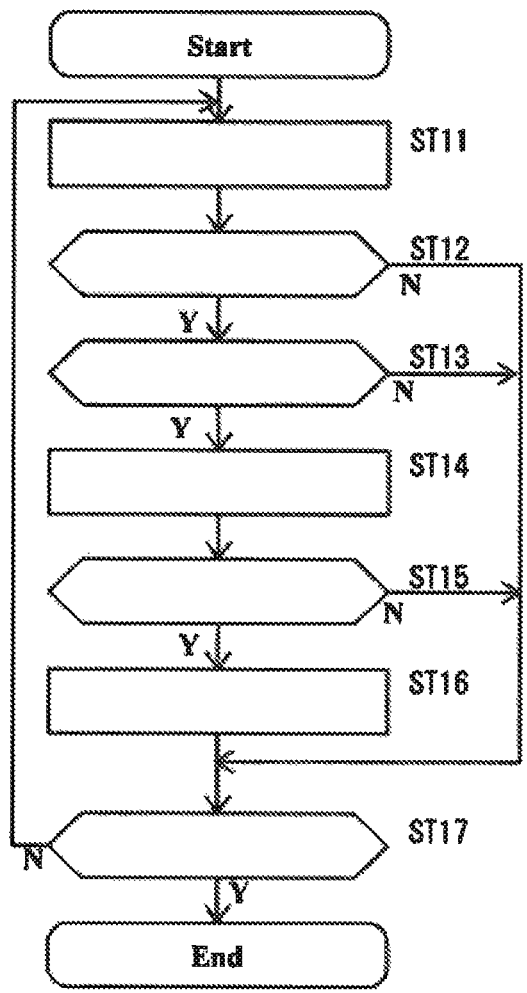
FIG. 5 is a flowchart of occupant protection control in the automobile illustrated in FIG. 1.

FIG. 5 is a flowchart of the occupant protection control performed in the automobile 1 illustrated in FIG. 1.

The occupant protection ECU 82 may repeatedly execute the occupant protection control illustrated in FIG. 5.

For example, the occupant protection ECU 82 may repeatedly execute the coupling detection control illustrated in FIG. 4 while the automobile 1 is traveling or while an occupant is present in the automobile 1.

In Step ST11, the detection value of an acceleration rate of the automobile 1 may be acquired. For example, the occupant protection ECU 82 may acquire the detection value of an acceleration rate from the acceleration sensor 86. The acceleration sensor 86, which may be a three-axial acceleration sensor, may detect the magnitude and direction of acceleration upon input of contact.

In Step ST12, the acquired detection value of the acceleration rate may be compared with a threshold. For example, the occupant protection ECU 82 may compare the acquired detection value with the threshold. In this example, the threshold may be used to detect contact of the automobile 1. Alternatively, the occupant protection ECU 82 may compare the absolute value of the acquired detection value with the threshold. If the detection value is greater than or equal to the threshold (Step ST12: Y), the occupant protection ECU 82 may cause the process to proceed to Step ST13. If the detection value is less than the threshold (Step ST12: N), the occupant protection ECU 82 may cause the process to proceed to Step ST17.

In Step ST13, it may be determined whether the contact of the automobile 1 is frontal contact. For example, the occupant protection ECU 82 may determine whether the contact of the automobile 1 is frontal contact. If an input direction of the acquired detection value is a frontal direction, such as a direction from the front face of the automobile 1, the occupant protection ECU 82 may determine that the contact of the automobile 1 is frontal contact (Step ST13: Y), and may cause the process to proceed to Step ST14. If the input direction of the acquired direction value is not the frontal direction (Step ST13: N), the occupant protection ECU 82 may cause the process to proceed to Step ST17.

In Step ST14, control for deploying the front air-bag device 58 may be executed. For example, the occupant protection ECU 82 may select the seatbelt device 57 and the front air-bag device 58 as the output destinations, and may output the operation signal to each of the selected output destinations. The occupant protection ECU 82 may output a front operation signal to the front air-bag device 58 to thereby cause the front air-bag device 58 to be deployed in front of the occupant.

In Step ST15, it may be determined whether the pet protection is to be performed. For example, as the frontal contact has been detected, the occupant protection ECU 82 may determine whether the pet protection is to be performed. The occupant protection ECU 82 may acquire the setting value regarding the pet protection from the occupant protection memory 83. If the acquired setting value is the setting value indicating execution of the pet protection (Step ST15: Y), the occupant protection ECU 82 may cause the process to proceed to Step ST16 to execute the pet protection. If the acquired setting value is the setting value indicating cancellation of the pet protection (Step ST15: N), the occupant protection ECU 82 may cause the process to proceed to Step ST17 not to execute the pet protection.

In Step ST16, control for deploying the pet air-bag device 30 may be executed. For example, the occupant protection ECU 82 may select the pet air-bag device 30 as the output destination, and may output the operation signal to the selected output destination. The occupant protection ECU 82 may output a pet operation signal to the pet air-bag device 30.

The pet air-bag inflator 32 of the pet guard apparatus 20 may be thereby operated. The pet air-bag 35 stored in a folded state may start deployment downwardly from an upper edge of the pet guard body 21 to entirely cover the mesh member 23 of the pet guard body 21 from behind the mesh member 23. In this case, the pet air-bag 35 may be deployed in a region narrower than the pet guard body 21 in the vehicle width direction.

This prevents the pet from easily hitting strongly or directly against the pet guard body 21 having high rigidity. It is therefore expected that the safety of the pet is enhanced at the time of frontal contact.

In Step ST17, it may be determined whether the control is to be ended. For example, the occupant protection ECU 82 may determine whether the occupant protection control is to be ended. If the automobile 1 is stopped and the occupant gets out of the automobile 1, for example, the occupant protection ECU 82 may determine that the occupant protection control is to be ended (Step ST17: Y). In this case, the occupant protection ECU 82 may end the control. Otherwise (Step ST17: N), the occupant protection ECU 82 may return the process to Step ST11. The occupant protection ECU 82 may repeatedly execute the procedure from Step ST11 to Step ST17 until it is determined that the occupant protection control is to be ended.

Alternatively, the occupant protection ECU 82 may estimate contact of the automobile 1, and may output the various kinds of signals described above to the automobile 1 before contact such as frontal contact of the automobile 1 is detected.

As described above, the occupant protection ECU 82, which serves as the controller, is able to deploy the pet air-bag 35 upon contact of the automobile 1.

Figure 6:
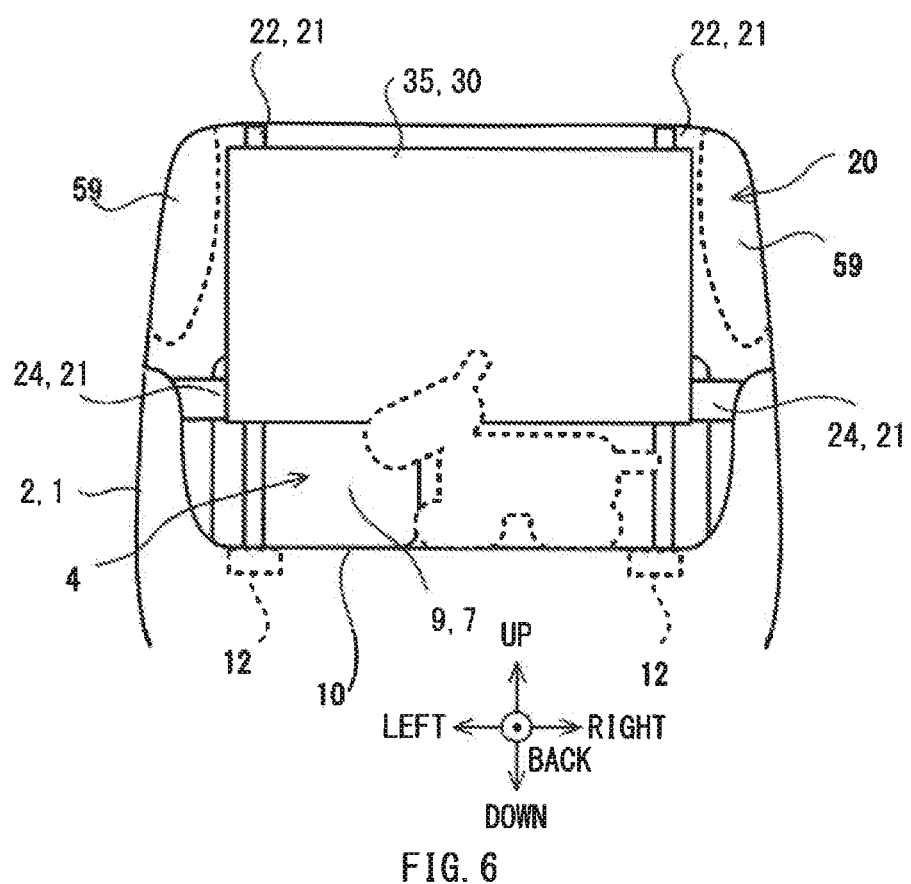
FIG. 6 is an explanatory diagram illustrating an exemplary deployed state of the pet air-bag device in the automobile illustrated in FIG. 1.

FIG. 6 illustrates an exemplary deployed state of the pet air-bag device 30 in the automobile illustrated in FIG. 1.

FIG. 6 may be associated with FIG. 2.

In FIG. 6, the pet air-bag 35 of the pet air-bag device 30 may be deployed downwardly from the upper edge of the pet guard body 21 to entirely cover the mesh member 23 of the pet guard body 21 from behind the mesh member 23.

The pet air-bag 35 may be deployed within a width range between the deploying regions of the paired side curtain air-bag devices 59 provided at the left and right sides of the cargo room 4. That is, the pet air-bag 35 may be deployed so as not to interfere with deployment of the side curtain air-bag devices 59 provided at the left and right sides of the cargo room 4. In a case where the automobile 1 does not include the side curtain air-bag devices 59, the pet air-bag 35 may be deployed within the entire width range of the cargo room 4.

The pet air-bag 35 deployed as described above prevents the pet in the cargo room 4 from easily hitting strongly and directly against the pet guard body 21 having high rigidity. It is therefore expected that the safety of the pet is enhanced at the time of frontal contact.

According to the first example embodiment described above, the pet guard body 21 is provided in the vehicle compartment of the automobile 1 so as to partition the vehicle compartment into the front portion and the rear portion, i.e., the occupant compartment 3 and the cargo room 4. This prevents the pet placed in the cargo room 4 behind the pet guard body 21 in the vehicle compartment and from easily being thrown forward over the pet guard body 21 upon front contact of the automobile 1. Thus, it is possible to protect the pet placed in the cargo room 4 of the automobile 1.

In an ordinary state where no frontal contact is made, the pet air-bag 35 is not deployed, and the vehicle compartment of the automobile 1 may be partitioned into the front portion and the rear portion only by the pet guard body 21. This allows the occupant to visually recognize the pet placed in the rear portion of the vehicle compartment or the cargo room 4 through the pet guard body 21, and eliminates the need for the occupant to stop the automobile 1, get out of the automobile 1, and go to the cargo room 4 to check the state of the pet placed in the rear portion of the vehicle compartment or the cargo room 4. Further, this allows the pet to respond to a call from the occupant in the rear portion of the vehicle compartment or the cargo room 4 without being trapped in a cage narrower than the rear portion of the vehicle compartment or the cargo room 4.

Further, according to the first example embodiment described above, the pet air-bag device 30 is provided behind the pet guard body 21. The pet air-bag device 30 may be a curtain-shaped air-bag to be deployed downwardly in the vertical direction along the pet guard body 21. The occupant protection ECU 82, which serves as the controller, deploys the pet air-bag 35 upon frontal contact of the automobile 1. When frontal contact is made, the pet placed in the cargo room 4 behind the pet guard body 21 in the vehicle compartment is moved forward and hits against the pet air-bag 35 in the deployed state. Accordingly, the pet is prevented from easily hitting strongly and directly against the pet guard body 21. Thus, it is possible to achieve more appropriate pet protection.

According to the first example embodiment described above, it is possible to enhance the safety of a pet in the automobile 1 while securing convenience of an occupant or a passenger of the automobile 1, According to the first example embodiment, the pet air-bag device 30 attached to the pet guard body 21 may be coupled to the occupant protection ECU 82 via the device-side connector 36. Thus, in the first example embodiment, the pet air-bag device 30 may be detachable together with the pet guard body 21 from the automobile 1 by detaching the pet guard body 21 from the automobile 1. In a case where no pet is loaded on the automobile 1, the pet guard body 21 and the pet air-bag device 30 may be detached from the vehicle body 2. Thus, the automobile 1 may be used in an original condition without the pet guard body 21. Further, as the pet air-bag device 30 is detached together with the pet guard body 21, the situation is eliminated where only the pet air-bag device 30 is left in the automobile 1 and the pet air-bag device 30 is unintentionally deployed despite that no pet is present in the automobile 1.

Further, the occupant protection ECU 82 may determine whether the device-side connector 36 of the pet air-bag device 30 is coupled to the vehicle-side connector 87. In a case where the pet air-bag device 30 is not coupled to the vehicle-side connector 87, the occupant protection ECU 82 may execute the control in which the operation signal to deploy the pet air-bag device 30 is not outputted, Thus, the occupant protection ECU 82 makes it possible to execute control appropriate for an actual condition of the automobile 1.

Second Example Embodiment

Descried next is the automobile 1 with a pet protection function according to a second example embodiment of the disclosure. In the second example embodiment, the pet protection function may be further improved.

The following description focuses on differences from the foregoing example embodiment. Elements having substantially the same function and configuration as those in the foregoing example embodiment are denoted with the same reference numerals to avoid any redundant description.

Figure 7:
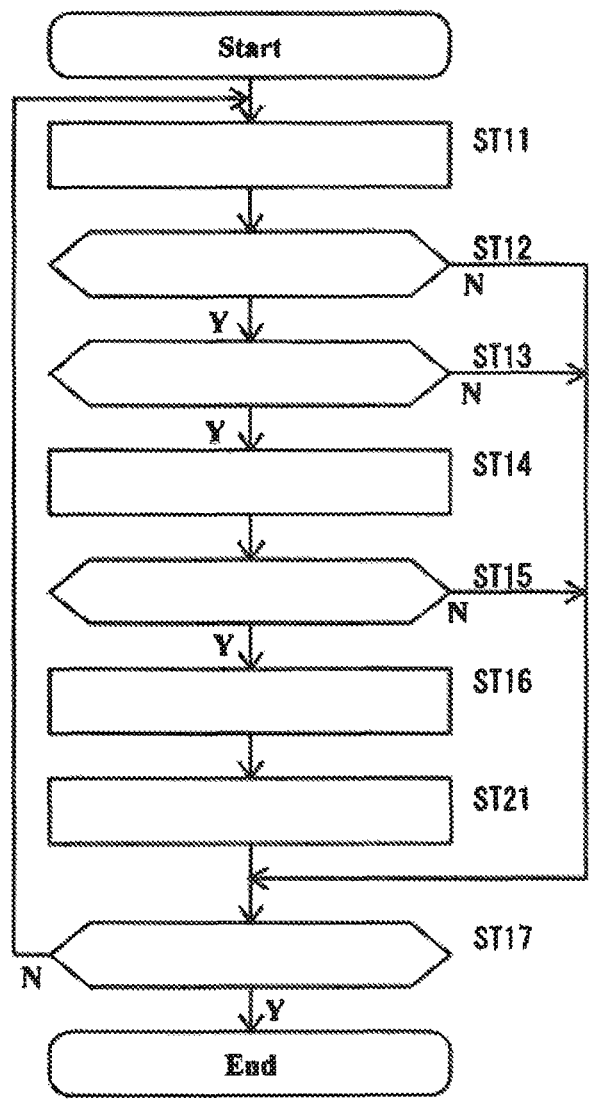
FIG. 7 is a flowchart of occupant protection control in the automobile according to one example embodiment of the disclosure.

FIG. 7 is a flowchart illustrating occupant protection control performed in the automobile 1 according to the second example embodiment of the disclosure.

While the automobile 1 is traveling or while an occupant is present in the automobile 1, for example, the occupant protection ECU 82 may execute the occupant protection control illustrated in FIG. 7 instead of the occupant protection control illustrated in FIG. 5.

Step ST11 to Step ST16 in FIG. 7 may be similar to those in FIG. 5. After Step ST16, the occupant protection ECU 82 may perform Step ST21.

In Step ST21, control to deploy the side curtain air-bag devices 59 may be executed. The occupant protection ECU 82 may output a side curtain operation signal to each of the side curtain air-bag devices 59. The side curtain air-bag devices 59 may be deployed beside the occupant along the left and right sides of the vehicle compartment.

As described above, when deploying the pet air-bag device 30, the occupant protection ECU 82 may deploy the side curtain air-bag devices 59 configured to be deployed near the pet air-bag device 30.

Such cooperation described above allows the side curtain air-bag devices 59 to operate in cooperation with the pet air-bag device 30 and deploy substantially at the same time as the pet air-bag device 30 upon frontal contact of the automobile 1.

Upon the frontal contact of the automobile 1, the side-curtain air-bag devices 59 may not be selected as the output destinations by the occupant protection ECU 82, and the operation signal may not be sent from the occupant protection input/output port 84 to the side-curtain air-bag devices 59. However, the side-curtain air-bag devices 59 is able to deploy in cooperation with the pet air-bag device 30.

Accordingly, as illustrated in FIG. 6, the paired side-curtain air-bag devices 59 provided at the left and right sides of the vehicle compartment are able to cover the gaps between the pet air-bag 35 of the pet air-bag device 30 in the deployed state and the left and right sides of the vehicle compartment. This prevents the pet from easily passing through the gaps.

Further, the pet air-bag 35 may be deployed so as not to interfere with the deploying regions of the side curtain air-bag device 59 in the rear portion of the vehicle compartment or the cargo room 4. In one embodiment, the side curtain air-bag device 59 may serve as a "second air-bag device".

According to the second example embodiment described above, the pet air-bag 35 of the pet air-bag device 30 is deployed in the cargo room 4 behind the pet guard body 21. The pet air-bag 35 may be deployed so as not to interfere with the deploying regions of the side curtain air-bag devices 59 to be deployed along the sides of the vehicle compartment.

Further, according to the second example embodiment, it may be determined whether the pet air-bag 35 is to be deployed on the basis of kinds of contact of the automobile 1. In the second example embodiment, it may be determined that the pet air-bag 35 of the pet air-bag device 30 is to be deployed in a case where the contact of the automobile 1 is frontal contact. Moreover, in the second example embodiment, when the pet air-bag 35 of the pet air-bag device 30 is deployed, the side curtain air-bag devices 59 may be deployed together with the pet air-bag 35. The side curtain air-bag devices 59 in the deployed state cover the gaps between the pet air-bag 35 in the deployed state and the respective sides of the vehicle compartment. Thus, upon frontal contact, the side curtain air-bag devices 59 are deployed together with the pet air-bag device 30 to partition the vehicle compartment without large gaps. This prevents the pet placed in the rear portion of the vehicle compartment or the cargo room 4 from easily being thrown forward through the gap between the pet air-bag 35 in the deployed state and the side of the vehicle compartment.

In the second example embodiment, the occupant protection ECU 82 may deploy the side curtain air-bag devices 59, which serves as the second air-bag device, together with the pet air-bag device 30.

Alternatively, the second air-bag device to be deployed together with the pet air-bag device 30 by the occupant protection ECU 82 may be another device than the side curtain air-bag devices 59, for example. In this case, the occupant protection ECU 82 may deploy the second air-bag device together with the side curtain air-bag device 59 and the pet air-bag device 30.

Third Example Embodiment

Described next is the automobile 1 with a pet protection function according to a third example embodiment of the disclosure. In the third example embodiment, the pet protection function may be further improved by deploying the air-bag devices depending on the size of a pet.

The following description focuses on differences from the foregoing example embodiment. Elements having substantially the same function and configuration as those in the foregoing example embodiment are denoted with the same reference numerals to avoid any redundant description.

FIG. 8 is a block diagram of the control system 40 of the automobile 1 according to the third example embodiment of the disclosure.

The control system 40 of the automobile 1 illustrated in FIG. 8 may include a vehicle detector 41, a traveling control device 42, an event logger 43, an outside-vehicle communicator 44, an in-vehicle communicator 45, an operation detector 46, an occupant protection control apparatus 47, and a central gate way (CGW) 48 to which these devices are coupled.

The CGW 48 may control communication among multiple devices provided in the control system 40 of the automobile 1. Each of the devices provided in the control system 40 may be coupled to the CGW 48 with a bus cable. The COW 48 may control relay of communication data packets from one of the devices to another of the devices. The COW 48 and the bus cables may constitute a communication network in the automobile 1. The communication network in the automobile 1 may be, for example, a controller area network (CAN).

Various sensors provided in the automobile 1 may be coupled to the vehicle detector 41. In this example, an outside-vehicle camera 51, the acceleration sensor 86, a cargo room camera 53, a cargo room radar 54, a cargo room weight sensor 55, and the coupling sensor 88 may be coupled to the vehicle detector 41.

The outside-vehicle camera 51 may be disposed so as to face the front in the occupant compartment 3 of the automobile 1. In this case, the outside-vehicle camera 51 may capture an image of a region in front of the automobile 1. The captured image of the region in front of the automobile 1 may include an image of another automobile traveling ahead of the automobile 1. The outside-vehicle camera 51 may be a 360-degree camera. Alternatively, multiple outside-vehicle cameras 51 may be provided in the automobile 1.

The cargo room camera 53 may capture an image of the cargo room 4 of the automobile 1. For example, the cargo room camera 53 may capture an image of a baggage or a pet placed in the cargo room 4 at an imaging angle depending on the size or dimensions of the baggage or the pet.

The cargo room radar 54 may scan the cargo room 4 of the automobile 1 with a radar beam. The result of radar scanning performed on the cargo room 4 in which a baggage or a pet is placed may be different from the result of radar scanning performed on the cargo room 4 in which a baggage or a pet is not placed. The cargo room radar 54 may detect the dimensions or size of a region in which such differential data is generated.

The cargo room weight sensor 55 may be provided on the floor 10 of the cargo room 4 of the automobile 1 and detect the weight of a baggage or a pet placed on the floor 10 of the cargo room 4 of the automobile 1.

These various sensors 51, 53, 54, and 55 may be sensors to detect a pet in the vehicle compartment.

The vehicle detector 41 may output detection values obtained by these various sensors and values generated on the basis of the detection values to the other devices coupled to the vehicle detector 41 via the CGW 48. Examples of the other devices may include the occupant protection control apparatus 47. For example, the vehicle detector 41 may output the detection value of a current acceleration rate detected by the acceleration sensor 86 and the coupling information acquired by the coupling sensor 88 to the occupant protection control apparatus 47 with broadcast transmission.

In the control system 40 of the automobile 1 described above, the occupant protection control apparatus 47 may include no acceleration sensor and no coupling sensor therein.

The traveling control device 42 may control traveling of the automobile 1, For example, the traveling control device 42 may control manual driving, driver assistance driving, and automatic driving of the automobile 1 on the basis of a value outputted by the vehicle detector 41.

The outside-vehicle communicator 44 may establish a radio communication path to a non-illustrated base station outside the automobile 1. The automobile 1 may send and receive data to/from an outside-vehicle server via the radio communication path to the base station. For example, when an emergency event such as contact of the automobile 1 is detected or estimated, the occupant protection control apparatus 47 may cause the outside-vehicle communicator 44 to send an emergency notification. The outside-vehicle communicator 44 may further establish a radio communication path to another automobile.

The in-vehicle communicator 45 may detect another device such as a mobile terminal or an IOT device (not illustrated), placed in the vehicle, and may establish a radio communication path to the other device. The in-vehicle communicator 45 may send and receive data to/from the other device, such as a mobile terminal or an JOT device, via the ratio communication path.

The in-vehicle communicator 45 may determine whether the other device is located inside the vehicle or outside the vehicle on the basis of response delay time of the other device. The response delay time of the other device located outside the vehicle may tend to be longer than that of the other device located inside the vehicle.

The operation detector 46 may detect operations performed by the occupant on various user interfaces (UI) or a setting switch 56 that are provided in the vehicle.

The setting switch 56 may include, for example, a switch to be switched in accordance with the presence or absence of the pet guard apparatus 20 attached to the vehicle compartment, and a switch to be used to set the type or size of a pet to be placed in the cargo room 4.

When an event to be recorded happens in the automobile 1, the event logger 43 may record and accumulate the event in a chronological order. In the event logger 43, event logs of the various operations described above may be recorded.

For example, in the event logger 43, various events including an event about driving generated by the traveling control device 42, an event about contact detection generated by the occupant protection control apparatus 47, and an event about deployment of any air-bag generated by the occupant protection control apparatus 47 may be recorded and accumulated in a chronological order.

Figures 9, 10:
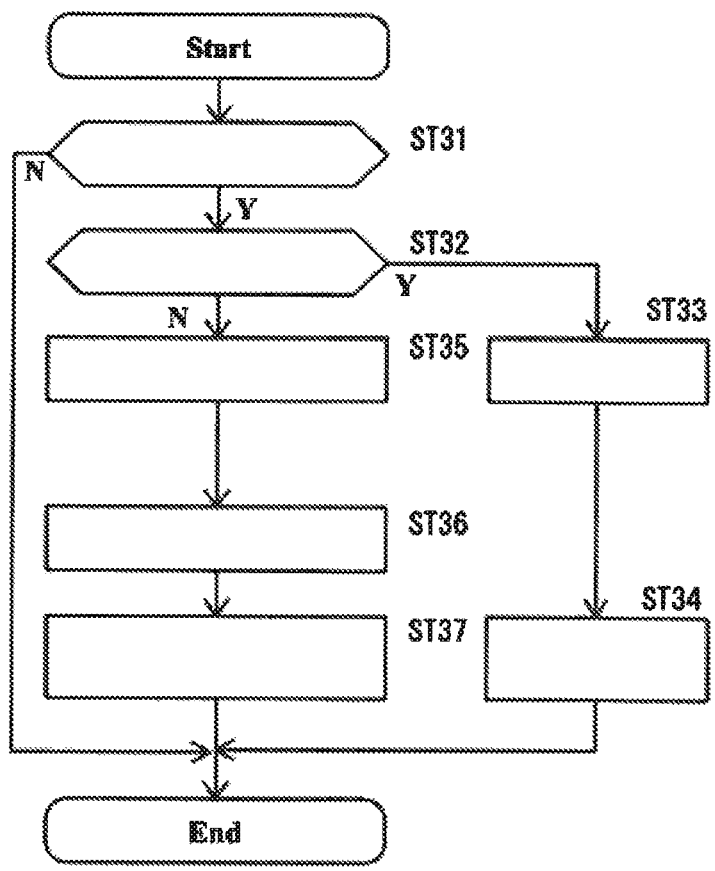
FIG. 9 is a flowchart of pet-size determination control performed by the control system of the automobile illustrated in FIG. 8.
FIG. 10 is an explanatory diagram illustrating an deployment output setting table used in a pet-size determination process illustrated in FIG. 9.

FIG. 9 is a flowchart of pet-size determination control performed by the control system 40 of the automobile 1 illustrated in FIG. 8.

The occupant protection ECU 82 of the occupant protection control apparatus 47 may repeatedly execute the pet-size determination control illustrated in FIG. 9.

In Step ST31, it may be determined whether a pet is present in the automobile 1, For example, the occupant protection ECU 82 of the occupant protection control apparatus 47 may determine whether a pet is present in the automobile 1.

The cargo room camera 53 in the control system 40 of the automobile 1 may capture an image of the pet placed in the cargo room 4 of the automobile 1. The size of the pet included in the captured image may depend on the actual size of the pet.

The cargo room radar 54 may scan the pet placed in the cargo room 4 of the automobile 1 with a radar beam. The size of the pet included in the result of radar scanning may depend on the actual size of the pet.

The cargo room weight sensor 55 may detect the weight of the pet placed in the cargo room 4 of the automobile 1.

For example, the in-vehicle communicator 45 may detect a non-illustrated IOT device attached to the collar of the pet. The IOT device may include data on the size of the pet.

In a case where pet detection information detected by any of these sensors is acquired from the control system 40 of the automobile 1, the occupant protection ECU 82 may determine that a pet is present in the automobile 1 (Step ST31: Y).

In this case, the occupant protection ECU 82 may cause the process to proceed to Step ST32.

In a case where no pet detection information is detected by any of these sensors, the occupant protection ECU 82 may determine that no pet is present in the automobile 1 (Step ST31: N). That is, the occupant protection ECU 82 makes it possible to determine the absence of a pet in the automobile 1 even while the pet guard apparatus 20 is attached to the automobile 1. In this case, the occupant protection ECU 82 may end the control.

In a case where the vehicle-side connector 87 and the device-side connector 36 are coupled to each other, the coupling sensor 88 may detect the coupling. The occupant protection ECU 82 may determine whether the pet guard apparatus 20 is attached to the automobile 1 on the basis of whether the coupling has been detected by the coupling sensor 88.

Alternatively, in a case where the coupling has been detected by the coupling sensor 88, the occupant protection ECU 82 may cause the process to proceed to Step ST32 assuming that a pet is present in the automobile 1.

In Step ST32, it may be determined whether any setting regarding the pet has been set. For example, the occupant protection ECU 82 may determine whether any setting regarding the pet has been set to the control system 40 of the automobile 1.

The control system 40 of the automobile 1 may include, as the setting switch 56 illustrated in FIG. 8, a switch to be switched in accordance with the presence or absence of the pet guard apparatus 20 attached to the vehicle compartment, and a switch to be used to set the type or size of the pet to be placed in the cargo room 4, for example.

In a case where the setting switch 56 is provided or operated, the occupant protection ECU 82 may determine that any setting has been set to the control system 40 of the automobile 1 (Step ST32: Y), and may cause the process to proceed to Step ST33.

Otherwise (Step ST32: N), the occupant protection ECU 82 may cause the process to proceed to Step ST35.

In Step ST33, the setting regarding the pet may be acquired. For example, the occupant protection ECU 82 may acquire the setting value regarding the type or size of the pet set with the setting switch 56 via the operation detector 46.

In Step ST34, a deployment setting may be set on the basis of the acquired setting regarding the pet. In one example, the occupant protection ECU 82 may set the deployment setting to deploy the pet air-bag 35 in accordance with the type or size of the pet set with the setting switch 56.

For example, in a case where a large-sized dog has been detected or where a pet size larger than a threshold has been set, the occupant protection ECU 82 may set the deployment setting at a high output level, which may be a maximum output level.

In another case where a small-sized dog has been detected or where a pet size smaller than the threshold has been set, the occupant protection ECU 82 may set the deployment setting at a low output level, which may be half the maximum output level, for example.

The pet air-bag 35 deployed by the pet air-bag inflator 32 operating at the half output level may have a hardness lower than the hardness of the pet air-bag 35 deployed by the pet air-bag inflator 32 operating at the maximum output level. Thus, the shock generated when the pet hits against the pet air-bag 35 deployed at the low output level may be lower than the shock generated when the pet hits against the pet air-bag 35 deployed at the maximum output level.

Note that the number of types or sizes of pets, such as dogs, set with the setting switch 56 is not limited to two, and two or more types or sizes of pets, such as dogs, may be set with the setting switch 56. In a case where three or more types or sizes of pets are to be set, the occupant protection ECU 82 may switch the output level among, for example, three or more levels depending on the various kinds of settings.

Thereafter, the occupant protection ECU 82 may end the control.

In Step ST35, the results of the detection of the pet may be acquired. Since no setting has been set with the setting switch 56, the occupant protection ECU 82 may acquire the results of the detection of the pet performed by the sensors. As the results of the detection of the pet, the occupant protection ECU 82 may acquire an image of the cargo room 4 captured by the cargo room camera 53, the result of radar scanning of the cargo room 4 by the cargo room radar 54, and the weight acting on the cargo room 4 detected by the cargo room weight sensor 55. The occupant protection ECU 82 may further acquire and the result of the detection of a predetermined IOT device attached to the collar of the pet by the in-vehicle communicator 45.

In Step ST36, a determination regarding the pet may be performed on the basis of the acquired detection results. For example, the occupant protection ECU 82 may determine the size of the pet on the basis of detection information acquired from the multiple sensors.

In one example, the occupant protection ECU 82 may determine the size of the pet by comparing the size or weight of the pet in the pet detection results with a threshold size or a threshold weight.

The occupant protection ECU 82 may perform a determination to distinguish between large-sized pets (e.g., large-sized dogs) and small-sized pets (e.g., small-sized dogs) using a predetermined threshold, for example.

In Step ST37, a deployment setting inay be set on the basis of the results of determination regarding the pet. In one example, the occupant protection ECU 82 may set the deployment setting to deploy the pet air-bag 35 in accordance with the results of determination regarding the pet.

For example, in a case where the size of the pet in the captured image of the cargo room 4 or the result of the radar scanning is greater than or equal to a threshold, or in a case where the weight acting on the cargo room 4 is greater than or equal to a threshold, the occupant protection ECU 82 may determine that the pet is a large-sized pet (e.g., a large-sized dog), and may set the deployment setting at the high output level, which may be the maximum output level.

Otherwise, the occupant protection ECU 82 may determine that the pet is a small-sized pet (e.g., a small-sized dog), and may set the deployment setting at the low output level, which may be half the maximum output level.

Further, the occupant protection ECU 82 may adjust the determination to distinguish between large-sized pets (e.g., large-sized dogs) and small-sized pets (small-sized dogs) on the basis of data received from a predetermined IOT device attached to the collar of the pet, and may set the deployment setting at an output level appropriate for the result of the adjusted determination.

As described above, the determination regarding the pet may be performed on the basis of the combination of the results of detection obtained by the multiple sensors. Therefore, it is possible to enhance accuracy of the occupant protection ECU 82 in performing the determination regarding the pet actually present in the vehicle compartment. This allows for a more probable setting.

According to the third example embodiment described above, the occupant protection ECU 82 may prioritize the setting set with the setting switch 56 in accordance with the occupant's intention over other settings. In a case where there is no setting set with the setting switch 56 in accordance with the occupant's intention, the occupant protection ECU 82 may set an appropriate setting on the basis of the automatic detection of the pet.

Alternatively, unlike in the flowchart described above, the occupant protection ECU 82 may set a setting appropriate for the pet on the basis of the combination of the setting set with the setting switch 56 in accordance with the occupant's intention and the setting based on the automatic detection.

FIG. 10 illustrates a deployment output setting table 79 for the pet air-bag device 30. The deployment output setting table 79 may be used in the pet-size determination process illustrated in FIG. 9.

The deployment output setting table 79 illustrated in FIG. 10 may include pieces of information on the deployment setting depending on the size of a pet, the weight of a pet, and the type of a pet.

The deployment output setting table 79 illustrated in FIG. 10 may be stored in the occupant protection memory 83.

The occupant protection ECU 82 may read the deployment output setting table 79 illustrated in FIG. 10 from the occupant protection memory 83 in, for example, Step ST36 of FIG. 9, to thereby execute the pet determination.

The occupant protection ECU 82 may set the deployment output level on the basis of the deployment output setting table 79 illustrated in FIG. 10 in Step ST34 of FIG. 9.

In the pet determination based on the deployment output setting table 79 illustrated in FIG. 10, the occupant protection ECU 82 may first determine the size of the pet present in the cargo room 4 on the basis of the first column of the deployment output setting table 79.

For example, the occupant protection ECU 82 may determine the size of the pet by determining whether the size of the pet in the image captured by the cargo room camera 53 or the size of the pet detected by the cargo room radar 54 is greater than or equal to a threshold size for large-sized dogs.

If the size of the pet is greater than or equal to the threshold size for large-sized dogs, the occupant protection ECU 82 may determine that the size of the pet present in the cargo room 4 corresponds to the size of a large-sized dog, and may set the deployment setting for large-sized dogs. In Step ST36 in FIG. 9, the occupant protection ECU 82 may set a setting for an igniting operation of the pet air-bag inflator 32 so that the pet air-bag 35 will be deployed by the operation of the pet air-bag inflator 32 at the high output level.

In a case where the size of the pet is less than the threshold size for large-sized dogs, the occupant protection ECU 82 may then determine the weight of the pet present in the cargo room 4 on the basis of the second column of the deployment output setting table 79.

For example, the occupant protection ECU 82 may determine the weight of the pet by determining whether the weight of the pet detected by the cargo room weight sensor 55 is greater than or equal to a threshold weight for large-sized dogs.

If the weight of the pet is greater than or equal to the threshold weight for large-sized dogs, the occupant protection ECU 82 may determine that the weight of the pet present in the cargo room 4 corresponds to the weight of a large-sized dog, and may set the deployment setting for large-sized dogs. In Step ST36 of FIG. 9, the occupant protection ECU 82 may set the setting for an igniting operation of the pet air-bag inflator 32 so that the pet air-bag 35 will be deployed by the operation of the pet air-bag inflator 32 at the high output level.

If the weight of the pet is less than the threshold weight for large-sized dogs, the occupant protection ECU 82 may determine the type of the pet on the basis of the third column of the deployment output setting table 79.

For example, the occupant protection ECU 82 may determine whether the type of the pet present in the cargo room 4 is a large-sized dog on the basis of the setting information regarding the size of the pet set with the setting switch 56.

Alternatively, the occupant protection ECU 82 may determine whether the type of the pet present in the cargo room 4 is a large-sized dog on the basis of the pet information registered in an IOT device attached to the collar of the pet. The pet information registered in the IOT device may include data on the type, size, and weight of the pet.

If the type of the pet is a large-sized dog, the occupant protection ECU 82 may determine that the pet present in the cargo room 4 is a large-sized dog, and may set the deployment setting for large-sized dogs. In Step ST36 of FIG. 9, the occupant protection ECU 82 may set the setting for an igniting operation of the pet air-bag inflator 32 so that the pet air-bag 35 will be deployed by the operation of the pet air-bag inflator 32 at the high output level.

If the type of the pet is not a large-sized dog, the occupant protection ECU 82 may determine that the pet present in the cargo room 4 is a small-sized dog, and may set the deployment setting for small-sized dogs, as given in the fourth column of the deployment output setting table 79. In Step ST36 of FIG. 9, the occupant protection ECU 82 may set the setting for an igniting operation of the pet air-bag inflator 32 so that the pet air-bag 35 will be deployed by the operation of the pet air-bag inflator 32 at the low output level, which may be half the maximum output level of the pet air-bag inflator 32.

Thereafter, the occupant protection ECU 82 may execute the pet protection control with the output level of the pet air-bag inflator 32 being set at a level based on the size of the pet. The pet protection control executed in this example may be the one described in the first example embodiment with reference to FIG. 5 or the one described in the second example embodiment with reference to FIG. 7.

When frontal contact (e.g., a frontal collision) of the automobile 1 is detected, the occupant protection ECU 82 may cause the pet air-bag inflator 32 to operate at the set output level.

For example, if the deployment setting at the high output level is set on the basis of the first to third columns of the deployment output setting table 79 illustrated in FIG. 10, the pet air-bag inflator 32 may deploy the pet air-bag 35 at the maximum output level. The pet air-bag 35 deployed at the maximum output level is able to appropriately receive a heavy, large-sized dog thrown forward upon contact of the automobile 1 to prevent the dog from hitting strongly against the pet guard body 21.

In contrast, in a case where the deployment setting at the low output level is set on the basis of the fourth column of the deployment output setting table 79 illustrated in FIG. 10, the pet air-bag inflator 32 may deploy the pet air-bag 35 at the low output level, which may be half the maximum output level, for example. The pet air-bag 35 deployed at the low output level has an appropriate hardness not larger than necessary and is able to appropriately receive a relatively light, small-sized dog thrown forward upon contact of the automobile 1.

According to the third example embodiment described above, the size of the pet present in the vehicle compartment of the automobile 1 may be determined on the basis of the results of detection performed by the sensors to detect a pet in the vehicle compartment or the setting information regarding the pet in the vehicle compartment set with the setting switch 56. Further, according to the third example embodiment described above, the deployment state of the pet air-bag device 30 may be controlled on the basis of the determination regarding the pet. Note that the sensors to detect a pet may include the outside-vehicle camera 51, the cargo room camera 53, the cargo room radar 54, and the cargo room weight sensor 55. The occupant protection ECU 82 may serve as a sensor to detect a pet in the vehicle compartment and an acquiring unit to acquire the setting information on the pet present in the vehicle compartment.

For example, in a case where a heavy, large-sized pet, such as a large-sized dog, is present in the rear portion of the vehicle compartment or the cargo room 4, the occupant protection ECU 82 may deploy the pet air-bag 35 at the high output level. The pet air-bag 35 deployed at the high output level is able to appropriately receive the large-sized pet.

In another case where a light, small-sized pet, such as a small-sized dog, is present in the cargo room 4, for example, the occupant protection ECU 82 may deploy the pet air-bag 35 at the low output level. The pet air-bag 35 deployed at the low output level has an appropriate hardness not larger than necessary and is able to appropriately receive the small-sized pet. If the pet air-bag 35 is deployed to have a hardness similar to the hardness to receive a large-sized pet despite that a small-sized pet has been detected in the vehicle compartment of the automobile 1, the small-sized pet may hit against the pet air-bag 35 having high hardness with a large shock.

The foregoing example embodiments are mere examples of the embodiments of the disclosure, and the disclosure is not limited to the foregoing example embodiments. Various changes or modifications may be made without departing from the gist of the disclosure.

In the foregoing example embodiments, the pet air-bag device 30 includes the single pet air-bag 35; however, the pet air-bag device 30 may include a plurality of pet air-bags 35 arranged in the vertical direction in the automobile 1. The pet air-bags 35 may all be coupled to a common pet air-bag inflator 32, or may be coupled to respective pet air-bag inflators 32. The occupant protection ECU 82 of the pet air-bag device 30 may select one or more of the pet air-bags 35 to be deployed on the basis of the size of the pet, for example.

The invention claimed is:

1. A vehicle with a pet protection function, the vehicle comprising:
 a pet guard body disposed in a vehicle compartment of the vehicle on which a pet is to be loaded in such a manner that the pet guard body partitions the vehicle compartment into a front portion and a rear portion;
 a first air-bag device configured to be deployed behind the pet guard body;
 a controller configured to determine whether to deploy the first air-bag device upon contact of the vehicle; and
 a second air-bag device comprises a side curtain air-bag device configured to be deployed adjacent to the first air-bag device in the vehicle that deploys toward the first air-bag device, wherein
 the first air-bag device comprises a pet air-bag configured to be deployed not to interfere with a deploying region of the second air-bag device, and
 the controller is configured to determine whether to deploy the pet air-bag of the first air-bag device upon a frontal contact of the vehicle and deploy the second air-bag device together with the first air-bag device only upon the determination to deploy the pet air-bag of the first air-bag device according to the frontal contact.

2. The vehicle according to claim 1, wherein
 the pet air-bag of the first air-bag device is configured to be deployed in a cargo room corresponding to the rear portion of the vehicle compartment, and
 the second air-bag device comprises a side curtain air-bag device configured to be deployed along a side of the vehicle compartment.

3. The vehicle according to claim 1, wherein
 the controller is configured to
 determine whether to deploy the pet air-bag of the first air-bag device upon the frontal contact of the vehicle, and
 deploy the second air-bag device together with the first air-bag device upon the determination to deploy the pet air-bag of the first air-bag device according to the frontal contact of the vehicle.

4. The vehicle according to claim 1, further comprising a sensor configured to perform detection of the pet present in the vehicle compartment, wherein
 the controller is configured to
 perform a determination regarding the pet present in the vehicle compartment on a basis of a result of the detection performed by the sensor, and
 control a deployment state of the first air-bag device on a basis of a result of the determination regarding the pet.

5. The vehicle according to claim 2, further comprising a sensor configured to perform detection of the pet present in the vehicle compartment, wherein
 the controller is configured to
 perform a determination regarding the pet present in the vehicle compartment on a basis of a result of the detection performed by the sensor, and
 control a deployment state of the first air-bag device on a basis of a result of the determination regarding the pet.

6. The vehicle according to claim 3, further comprising a sensor configured to perform detection of the pet present in the vehicle compartment, wherein
 the controller is configured to
 perform a determination regarding the pet present in the vehicle compartment on a basis of a result of the detection performed by the sensor, and
 control a deployment state of the first air-bag device on a basis of a result of the determination regarding the pet.

7. The vehicle according to claim 1, further comprising an acquiring unit configured to acquire setting information regarding the pet placed in the vehicle compartment, wherein
 the controller is configured to
 perform a determination regarding the pet present in the vehicle compartment on a basis of the setting information acquired by the acquiring unit, and
 control a deployment state of the first air-bag device on a basis of a result of the determination regarding the pet.

8. The vehicle according to claim 2, further comprising an acquiring unit configured to acquire setting information regarding the pet placed in the vehicle compartment, wherein
 the controller is configured to
 perform a determination regarding the pet present in the vehicle compartment on a basis of the setting information acquired by the acquiring unit, and control a deployment state of the first air-bag device on a basis of a result of the determination regarding the pet.

9. The vehicle according to claim 3, further comprising an acquiring unit configured to acquire setting information regarding the pet placed in the vehicle compartment, wherein the controller is configured to perform a determination regarding the pet present in the vehicle compartment on a basis of the setting information acquired by the acquiring unit, and control a deployment state of the first air-bag device on a basis of a result of the determination regarding the pet.

10. The vehicle according to claim 1, wherein the first air-bag device is coupled to the controller via a connector of the vehicle and is attached to the pet guard body, and the first air-bag device is detachable together with the pet guard body from the vehicle.

11. The vehicle according to claim 2, wherein the first air-bag device is coupled to the controller via a connector of the vehicle and is attached to the pet guard body, and the first air-bag device is detachable together with the pet guard body from the vehicle.

12. The vehicle according to claim 3, wherein the first air-bag device is coupled to the controller via a connector of the vehicle and is attached to the pet guard body, and the first air-bag device is detachable together with the pet guard body from the vehicle.

13. A vehicle with a protection function, the vehicle comprising:

a guard body disposed in a vehicle compartment of the vehicle on which an animal is to be loaded in such a manner that the guard body partitions the vehicle compartment into a front portion and a rear portion;

a first air-bag device configured to be deployed behind the guard body;

a controller configured to determine whether to deploy the first air-bag device upon contact of the vehicle; and a second air-bag device comprises a side curtain air-bag device configured to be deployed near and toward the first air-bag device in the vehicle, wherein the first air-bag device comprises an air-bag configured to be deployed not to interfere with a deploying region of the second air-bag device, and the controller is configured to determine whether to deploy the air-bag of the first air-bag device upon a frontal contact of the vehicle and deploy the second air-bag device together with the first air-bag device only upon the determination to deploy the pet air-bag of the first air-bag device according to the frontal contact.

14. The vehicle according to claim 13, wherein the controller is configured to determine whether to deploy the air-bag of the first air-bag device upon the frontal contact of the vehicle, and deploy the second air-bag device together with the first air-bag device upon the determination to deploy the air-bag of the first air-bag device according to the frontal contact of the vehicle.

15. The vehicle according to claim 13, wherein the air-bag of the first air-bag device is configured to be deployed in a cargo room corresponding to the rear portion of the vehicle compartment, and the second air-bag device comprises a side curtain air-bag device configured to be deployed along a side of the vehicle compartment.

16. The vehicle according to claim 13, further comprising a sensor configured to perform detection of the animal present in the vehicle compartment, wherein the controller is configured to perform a determination regarding the animal present in the vehicle compartment on a basis of a result of the detection performed by the sensor, and control a deployment state of the first air-bag device on a basis of a result of the determination regarding the animal.

* * * * *